Patented June 18, 1929.

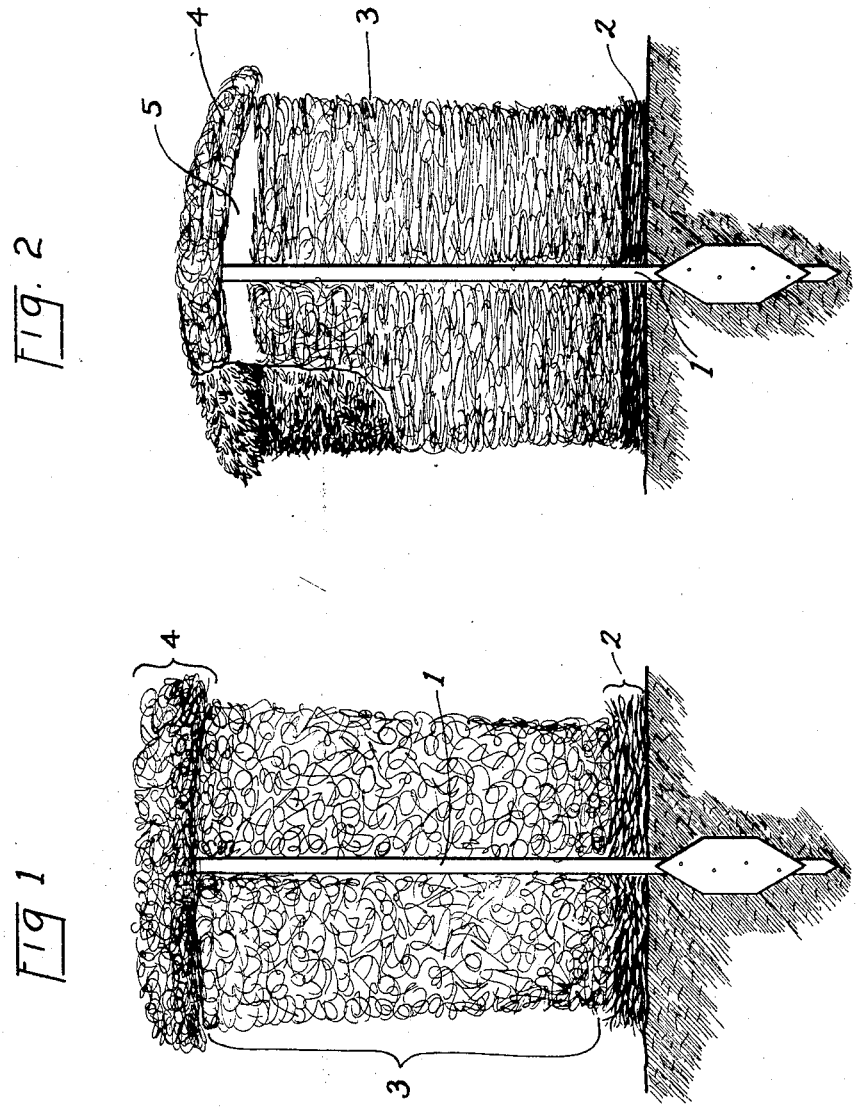

1,717,611

UNITED STATES PATENT OFFICE.

ORIN J. McNAUGHTON, OF MULLIKEN, MICHIGAN.

METHOD OF STACKING VINES.

Application filed July 13, 1928. Serial No. 292,374.

This invention relates to a method of stacking vines such as bean, pea, or peanut vines and the like.

The main objects of this invention are to provide an improved method of stacking vines so that they may properly cure in practically any kind of weather with a minimum of handling; to provide a method which will permit the vines to be piled in stacks as soon as matured and thereby allow other crops to be planted in the same field; to provide a method of stacking vines of this character which will give the maximum of protection against rain and inclement weather; and to provide a method which will keep the vines from contacting with the ground and thereby preventing moulding or rotting.

An illustrative embodiment of this invention is shown in the accompanying drawings in which:

Fig. 1 is a view in medial vertical section of a newly made stack of vines piled according to my improved method.

Fig. 2 is a view of the same after the stack has stood over night and the vines settled.

At the present time the usual method of harvesting beans, peas and the like is very unsatisfactory and often times an otherwise good and profitable crop is either entirely lost or so damaged as to detract very materially from the profitable raising of the same. When the crop has matured, the vines are ordinarily raked into wind-rows and very often at about the time the wind-rows of vines are to be gathered up for threshing, a rain will occur and wet down the vines so that they have to be turned over and scattered out with pitchforks to again dry. Sometimes this has to be gone through two or three times before the crop can be brought in and threshed. Such procedure is very costly not only in labor of handling and turning over of the vines, but also in the loss of the beans which occurs by reason of such handling.

Furthermore with the crop raked into wind-rows the fields cannot be plowed and utilized for the re-planting of another crop until the vines have been cured and removed from the field for threshing.

By using my improved method as soon as the crop is matured, the vines are raked into wind-rows and then piled about a supporting post in a particular shape and form of stack. The stack is of such character as to afford the maximum of protection against inclement weather, and the vines remain in such stack until cured and ready for threshing. The fields are thereby available for the planting of another crop immediately upon the gathering of the vines and no additional handling of the stacks is necessary or required until the same are to be threshed.

At any convenient time after the vines have been cured while in the stacks, the supporting post is withdrawn upwardly through the stack of vines thereby permitting them to be readily loaded on to a wagon a forkful at a time and taken in for threshing.

My improved method of stacking the vines is shown in the accompanying drawings in which:

A supporting post 1 of the type shown in my co-pending application executed and filed by me of even date herewith is driven into the ground. A few forkfuls of straw 2 are then placed around the post 1 on the ground to a thickness of preferably four to six inches. This layer of straw 2 is to keep the vines from contacting with the ground and thereby drawing dampness and moulding or rotting. Vines 3 are then placed or piled around the post 1, the stack formed thereby either being substantially straight sided or flaring out and increasing in diameter toward the top of the stack. These vines 3 are piled up in this manner until the stack is of substantially the same height as the top end of the supporting post 1.

A few large forkfuls of vines are then placed on the top of the stack and post to form a cap 4 which is preferably of slightly greater diameter than the top end of the stack of vines.

As is well known a stack of such vines will settle down over night and I have found that on the ordinary stack which is around four and one-half to five feet high, the settling of the vines 3 will be around six or eight inches. As this settling occurs, the center of the cap 4 is engaged and supported by the top end of the post 1 so as to leave an opening or space 5 thereunder. The center of the cap being supported on the post, it will incline or droop downwardly in all directions from such center and will provide a very efficient protection or cover for the top end of the stack. I have found by actual trial that even two or three bucketfuls of water thrown on the stack will not penetrate the cap 4 and wet the main portion 3 of the stack.

During a rain the top of the cap and the outer edges only of the stack become wet and by reason of the method in which the stack is made, such rain will dry off in a very short time and the vines may remain in such stack until thoroughly cured and ready to be threshed.

When it is desired to remove the stacks for threshing, the cap 4 is first removed, thereby exposing the upper end of the supporting post 1. This end of the post is then grasped by the hands and loosened in the ground and then withdrawn upwardly through the tangled vines 3. Vines 3 may then be removed in suitable forkfuls from the stack without difficulty.

Although but one specific method of handling the vines has been herein shown and described, it will be understood that details of this method may be altered or omitted without departing from the spirit of this invention as defined by the following claims.

I claim—

1. A method of stacking vines which comprises the placing of a supporting post in the ground in an upright position, piling the vines about such supporting post to a height substantially the same as the top end of said post and then placing a cap of vines over the top of said stack and post whereby when said stack of vines settles said cap will be supported at its center by said post.

2. A method of stacking vines which comprises the placing of a supporting post in the ground in an upright position, piling the vines about such supporting post to a height substantially the same as the top end of said post said stack being of the same or greater diameter at the top thereof than at the bottom thereof, and then placing a cap of vines over the top of said stack and post whereby when said stack of vines settles said cap will be supported at its center by said post.

3. A method of stacking vines which comprises the placing of a supporting post in the ground in an upright position, providing means around said post for keeping the vines from contact with the ground, piling the vines about such supporting post to a height substantially the same as the top end of said post and then placing a cap of vines over the top of said stack and post whereby when said stack of vines settles said cap will be supported at its center by said post.

4. A method of stacking vines which comprises the placing of a supporting post in the ground in an upright position, providing means around said post for keeping the vines from contact with the ground, piling the vines about such supporting post to a height substantially the same as the top end of said post said stack being of the same or greater diameter at the top thereof than at the bottom thereof, and then placing a cap of vines over the top of said stack and post whereby when said stack of vines settles said cap will be supported at its center by said post.

5. A method of stacking vines which comprises the placing of a supporting post in the ground in an upright position, placing a layer of straw on the ground around said post, piling the vines on said straw around said supporting post to a height substantially the same as the top end of said post, said stack being of substantially the same or greater diameter at the top thereof than at the bottom thereof and then placing a cap of vines over the top of said post and stack whereby when said stack of vines settles said cap will be supported by said post, said cap being of greater diameter than the top of said stack.

In testimony whereof I have hereunto set my hand at Grand Rapids, Michigan, this 11th day of July, 1928.

ORIN J. McNAUGHTON.